(12) United States Patent
Zhang et al.

(10) Patent No.: US 8,902,798 B2
(45) Date of Patent: *Dec. 2, 2014

(54) PHYSICAL LAYER FRAME FORMAT DESIGN FOR WIDEBAND WIRELESS COMMUNICATIONS SYSTEMS

(71) Applicant: Marvell International Ltd., Hamilton (BM)

(72) Inventors: Hongyuan Zhang, Fremont, CA (US); Rohit U Nabar, Sunnyvale, CA (US); Arul Durai Murugan Palanivelu, Sunnyvale, CA (US); Hui-Ling Lou, Sunnyvale, CA (US); Songping Wu, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/077,624

(22) Filed: Nov. 12, 2013

(65) Prior Publication Data

US 2014/0072080 A1    Mar. 13, 2014

Related U.S. Application Data

(63) Continuation of application No. 13/847,649, filed on Mar. 20, 2013, now Pat. No. 8,605,635, which is a (Continued)

(51) Int. Cl.
*H04B 7/00* (2006.01)
*H04L 1/00* (2006.01)

(Continued)

(52) U.S. Cl.
CPC ......... *H04L 27/2649* (2013.01); *H04L 25/0204* (2013.01); *H04L 1/0079* (2013.01); *H04L*

5/0007 (2013.01); *H04L 27/2602* (2013.01); *H04L 27/2601* (2013.01);

(Continued)

(58) Field of Classification Search
None
See application file for complete search history.

(56) References Cited

U.S. PATENT DOCUMENTS 6,754,195 B2 *    6/2004    Webster et al. ............... 370/335
7,394,864 B2 *    7/2008    Webster et al. ............... 375/295

(Continued)

FOREIGN PATENT DOCUMENTS

CN    1582553    2/2005
WO    03/005740 A2    1/2003

OTHER PUBLICATIONS

Office Action dated Apr. 3, 2013 issued in related/corresponding Chinese Patent Application No. 200980126648.0, filed Jan. 7, 2011.

(Continued)

*Primary Examiner* — Kibrom T Hailu

(57) ABSTRACT

Systems and methods are provided for processing a payload portion of a received signal in a single carrier mode or a multiple carrier mode based on a portion of the received signal. A single carrier signaling portion is received at a first rate, and whether the payload portion of the signal is a single carrier signal or a multiple carrier signal is detected from the received single carrier signaling portion. The payload portion of the received signal is received at the first rate and demodulated in a single carrier mode if the detecting determines that the payload portion of the received signal is a single carrier signal, and the payload portion of the received signal is demodulated in a multiple carrier mode if the detecting determines that the payload portion of the received signal is a multiple carrier signal.

12 Claims, 17 Drawing Sheets

Related U.S. Application Data continuation of application No. 12/489,865, filed on Jun. 23, 2009, now Pat. No. 8,441,968, which is a continuation-in-part of application No. 12/410,883, filed on Mar. 25, 2009, now Pat. No. 8,358,668.

(60) Provisional application No. 61/078,952, filed on Jul. 8, 2008, provisional application No. 61/043,384, filed on Apr. 8, 2008, provisional application No. 61/044,816, filed on Apr. 14, 2008, provisional application No. 61/076,453, filed on Jun. 27, 2008.

(51) Int. Cl.
 H04L 27/26 (2006.01)
 H04L 27/00 (2006.01)
 H04L 25/02 (2006.01)
 H04L 5/00 (2006.01)

(52) U.S. Cl.
 CPC ........ *H04L 27/0012* (2013.01); *H04L 27/0008* (2013.01); *H04L 5/0092* (2013.01); H04L 1/0072 (2013.01); H04L 25/022 (2013.01)
 USPC ........... 370/310; 370/470; 370/203; 370/252; 370/392; 370/522

(56) References Cited

U.S. PATENT DOCUMENTS

| | | | |
|---|---|---|---|
| 2003/0058952 A1* | 3/2003 | Webster et al. | 375/260 |
| 2007/0168841 A1 | 7/2007 | Lakkis | |
| 2007/0263653 A1* | 11/2007 | Hassan et al. | 370/437 |
| 2008/0247494 A1* | 10/2008 | Halford et al. | 375/343 |
| 2009/0154575 A1 | 6/2009 | Rofougaran | |
| 2009/0217334 A1* | 8/2009 | Nee | 725/111 |
| 2012/0087311 A1* | 4/2012 | Webster et al. | 370/328 |

OTHER PUBLICATIONS

EPO: Summons to attend oral proceedings pursuant to Rule 115(1) EPC issue for EP Application No. 09789891.0 on Oct. 8, 2012 (6 pages).

"Encapsulation (networking)," May 13, 2008, XP055037847 (2 pages), Retrieved from the Internet: URL:http://en.wikipedia.org/w/index.php?title=Encapsulation_(networking)&oldid=212048728 (retrieved on Sep. 11, 2012).

International Search Report and Opinion issued in connection with PCT/US2009/038222 and dated Jul. 22, 2009.

LAN/MAN Standards Committee of the IEEE Computer Society, Draft Supplement to Standard [for] Information Technology, Apr. 2003, IEEE P802, 11g/D8.2, Institute of Electrical and Electronics Engineers, Inc., New York, New York.

Majtaba, Syed Aon, TGn Sync Proposal Technical Specification, May 18, 2005, IEEE 802.11-04/0889r6, Institute of Electrical and Electronics Engineers, Inc.

LAN/MAN Standards Committee of the IEEE Computer Society, Part 15.3: Wireless Medium Access Control (MAC) and Physical Layer (PHY) Specifications for High Rate Wireless Personal Area Networks (WPANs), 2009, IEEE P802.15.3c/D07, Institute of Electrical and Electronics Engineers, Inc., New York, New York.

International Search Report and Opinion issued in connection with PCT/US2009/048245 and dated Dec. 4, 2009.

2nd Office Action dated Nov. 22, 2013, issued in related/corresponding Chinese Patent Application No. 200980126648.0.

* cited by examiner

PHYSICAL LAYER FRAME FORMAT DESIGN FOR WIDEBAND WIRELESS COMMUNICATIONS SYSTEMS

CROSS-REFERENCE TO RELATED APPLICATIONS

This application is a continuation of U.S. application Ser. No. 13/847,649, filed on Mar. 20, 2013, which is a continuation of U.S. application Ser. No. 12/489,865 (now U.S. Pat. No. 8,441,968), filed on Jun. 23, 2009, which is a continuation-in-part of U.S. application Ser. No. 12/410,883 (now U.S. Pat. No. 8,358,668), filed on Mar. 25, 2009, and which also claimed priority from U.S. Provisional Application No. 61/078,952, filed on Jul. 8, 2008, the entirety of which is incorporated herein by reference. U.S. Provisional Application No. 61/043,384, filed on Apr. 8, 2008, U.S. Provisional Application No. 61/044,816, filed Apr. 14, 2008, and U.S. Provisional Application No. 61/076,453, filed Jun. 27, 2008, are also related and are incorporated herein by reference.

FIELD

The technology described in this patent document relates generally to wideband wireless communications, and more particularly to physical layer frame formats.

BACKGROUND

Continued advances in computer technology increase interest in and demand for high data rate (e.g., >1 Gbps) wireless communication. These high data rate communications are often realized through the use of wide bandwidths. For example, Gbps data rates are often accomplished using several hundred MHz or several GHz of bandwidth. These large bandwidths are available around higher carrier frequencies such as the unlicensed 60 GHz band. FIG. 1 depicts an example 60 GHz frequency channel plan 30. The 60 GHz frequency channel plan 30 offers four channels 32 of about 2 GHz each centered near 60 GHz. While wide bandwidth channels offer opportunities for large data rates, the channels are often vulnerable to delay dispersion (delay spread) even at low range (e.g., less than 10 meters).

There are a wide variety of applications that can take advantage of wireless communications. Two pervasive applications are high data rate at large range applications and low/moderate data rate at short range applications. These applications have their own advantages and disadvantages.

In a high data rate at large range application, high data rates are achieved, but the system may have to tolerate a high delay spread. High delay spreads increase complexity and power requirements in transmitters and receivers. The higher complexity circuitry tends to have larger space requirements than short range devices, and the higher power needs are more suited for electrical plug-in devices as opposed to battery devices. In contrast, low/moderate data rate applications at a short range may be line-of-sight applications having a short delay dispersion and lower power requirements. These applications may be realized more easily in lower complexity handheld portable wireless systems that are often sensitive to power consumption.

FIGS. 2A and 2B depict block diagrams of a single carrier transmitter 40 and a single carrier receiver 50, respectively. In FIG. 2A, an encoder 42 receives input data 44 and encodes the data for transmission. The output of the encoder 42 is propagated to a single carrier modulator 46 that integrates the encoded data onto a single carrier for transmission over an antenna 48. In FIG. 2B, the receiver 50 receives single carrier wireless signals via an antenna 52 and propagates the received signals to a single carrier demodulator 54. The single carrier demodulator 54 extracts data from the received single carrier signal and passes the extracted data to a decoder 56. The decoder 56 decodes the extracted data and makes the decoded data 58 available to downstream circuitry.

FIGS. 3A and 3B depict block diagrams of a multiple carrier transmitter 60 and a multiple carrier receiver 70, respectively. In FIG. 3A, an encoder 62 receives input data 64 and encodes the data for transmission. The output of the encoder 62 is propagated to a multiple carrier modulator 66 that integrates the encoded data onto multiple carriers for transmission over an antenna 68. In FIG. 3B, the receiver 70 receives multiple carrier wireless signals via an antenna 72 and propagates the received signals to a multiple carrier demodulator 74. The multiple carrier demodulator 74 extracts data from the received multiple carrier signals and passes the extracted data to a decoder 76. The decoder 76 decodes the extracted data and makes the decoded data 78 available to downstream circuitry.

Data modulation schemes tend to be more compatible with some applications than others. For example, orthogonal frequency-division multiplexing (OFDM) is a multiple carrier multiplexing scheme that is suitable for sustaining high data rates in channels having a large delay due to the ease of frequency domain channel equalization. This makes OFDM compatible with the high data rate at large range application described above, as OFDM offers relatively simple equalization in a high delay spread channel, supports a longer range, and supports needed high data rates.

Disadvantages associated with an OFDM scheme, however, include a relatively high hardware complexity and low power efficiencies. In a wideband system having a high carrier frequency, such as 60 GHz, power amplifier (PA) efficiency at the transmitter, and analog-to-digital converter (ADC) bit-width at the receiver are engineering design challenges. Additionally, OFDM introduces high peak-to-average-ratio (PAPR) in the transmitted and received signal waveforms, requiring large headroom for the operating point at the power amplifier and analog-to-digital converter, which may reduce power amplifier efficiency and increase the complexity of analog-to-digital converter design.

It should be noted that the terms multiple carrier (MC) and OFDM modulation will be discussed throughout this disclosure and are in most cases interchangeable. Thus, where OFDM is referenced, other multiple carrier modulation techniques may be used. Similarly, references to multiple carrier modulations include OFDM implementations.

FIGS. 4A and 4B depict block diagrams of an OFDM transmitter 80 and an OFDM receiver 90, respectively. In FIG. 4A, an encoder 82 receives input data 84 and encodes the data for transmission. The output of the encoder 82 is propagated to an OFDM modulator 86 that integrates the encoded data onto multiple carriers for transmission over an antenna 88. In FIG. 4B, the receiver 90 receives OFDM wireless signals via an antenna 92 and propagates the received signals to an OFDM demodulator 94. The MC demodulator 94 extracts data from the received OFDM signal and passes the extracted data to a decoder 96. The decoder 96 decodes the extracted data and makes the decoded data 98 available to downstream circuitry.

In line of sight channels or other applications requiring lower data rates, a single carrier (SC) modulation with a time-domain equalizer is often sufficient. A single carrier system may offer simplicity in hardware combined with low power requirements and high transmit power efficiency.

Single carrier modulation may present a constant envelope and/or low peak-to-average ratio easing power amplifier and analog-to-digital converter design. However, single carrier systems typically require complicated equalizers for high delay spread channels, effectively limiting the range for high data rate transfers.

SUMMARY

In accordance with the teachings herein, systems and methods are provided for a processor-implemented method of processing a received signal including a payload portion and a signaling portion, the signaling portion of the received signal being a single carrier signal, the payload portion of the received signal being a single carrier signal or a multiple carrier signal. The systems and methods may include receiving the signaling portion of the received signal at a first sampling rate and detecting from the signaling portion of the received signal whether the payload portion of the received signal is a single carrier signal or a multiple carrier signal. The payload portion of the received signal may be received at the first sampling rate and demodulated in a single carrier mode in response to the payload portion of the received signal being a single carrier signal or a multiple carrier mode in response to the payload portion of the received signal being a multiple carrier signal. Data from the demodulated payload portion of the received signal may be stored in a computer readable memory.

As another example, a system for transmitting a signal including a payload portion and a signaling portion, where the signaling portion of the transmitted signal is a single carrier signal, and the payload portion of the signal is a single carrier signal or a multiple carrier signal may include a single carrier modulator for modulating at least the signaling portion of the transmitted signal and a multiple carrier modulator for modulating the payload portion of the transmitted signal as a multiple carrier signal when the system is in a multiple carrier mode. The system may further include a clock for applying a common sampling rate to an output of the single carrier modulator and an output of the multiple carrier modulator.

As a further example, a system for processing a received signal including a payload portion and a signaling portion, where the signaling portion of the received signal is a single carrier signal, and the payload portion of the received signal is a single carrier signal or a multiple carrier signal may include a signaling portion analyzer configured to receive the signaling portion of the received signal at a first sampling rate and to detect from the signaling portion of the received signal whether the payload portion of the received signal is a single carrier signal or a multiple carrier signal. The system may also include a demodulator configured to receive the payload portion of the received signal at the first sampling rate and to demodulate the payload portion of the received signal in a single carrier mode in response to the payload portion of the received signal being a single carrier signal, where the demodulator is further configured to demodulate the payload portion of the received signal in a multiple carrier mode in response to the payload portion of the received signal being a multiple carrier signal. The system may further include a computer-readable memory configured to store data from the demodulated payload portion of the received signal.

DETAILED DESCRIPTION

Based on the application, at least three types of wideband devices may be present in a wireless network: 1.) SC-Only devices such as simple handheld, low-range, low-power devices; 2.) MC-Only devices that target longer range and higher data rates that are not as sensitive to power and complexity as SC-Only devices; and 3.) Dual-Mode devices that take advantage of both single carrier modulation and multiple carrier modulation that may control or talk with both single carrier and multiple carrier devices. Co-existence between these various types of devices may be problematic, especially if the devices cannot communicate to each other—e.g., SC-Only devices may not be able to communicate with MC-Only devices.

To alleviate these communications issues, a common preamble/header frame format may be used for the physical layer that may be utilized by all three types of devices. Using this common format, any device may understand the preamble/header of any packet. This enables network traffic to be well-controlled without transmission conflicts. Hardware complexity may also be reduced because any device (including the dual mode device) need only implement one single carrier sense, synchronization, header decoding, or channel estimation mechanism at its receiver. The common preamble and header is included in transmissions of both single carrier modulated packets and multiple carrier modulated packets. The common preamble and header is transmitted in a single carrier mode such that all three of the above described wideband devices may interpret the preamble and header, and all devices in the network are designed such that all devices can understand the single carrier common preamble and header.

Figure 2A:
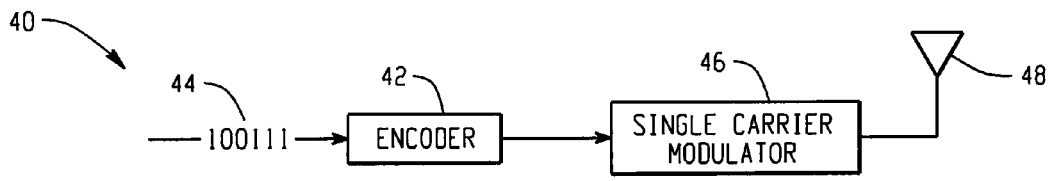
FIGS. 2A and 2B depict block diagrams of a single carrier transmitter and a single carrier receiver.
Figure 5A:
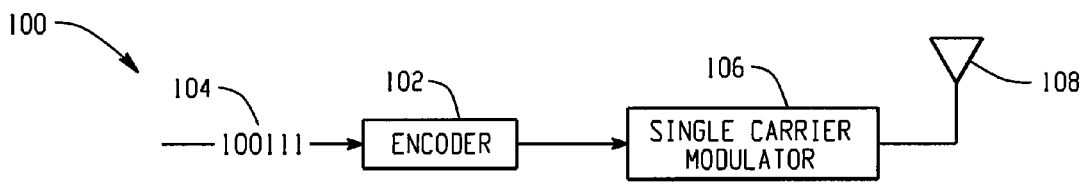
FIGS. 5A and 5B depict block diagrams of a single carrier transmitter and a dual mode transmitter.
Figure 5B:
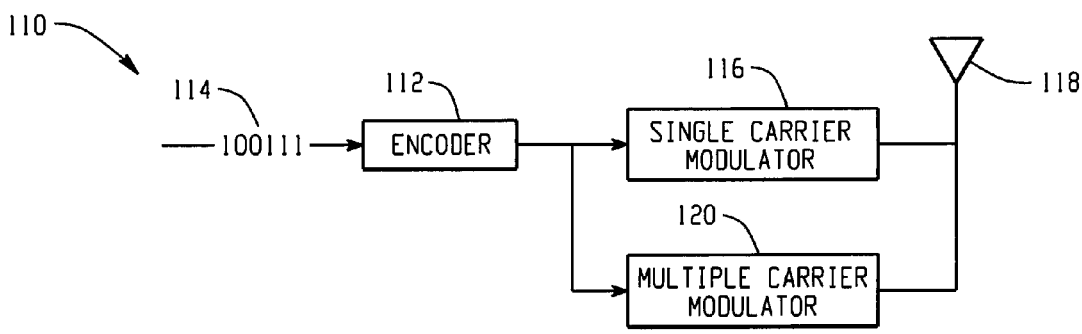

FIGS. 5A and 5B depict block diagrams of a single carrier transmitter 100 and a dual mode transmitter 110 for transmitting packets according to the above described format The single carrier transmitter 100 of FIG. 5A includes an encoder 102 that receives data 104 that encodes the data for transmission. A single carrier modulator 106 receives the output of the encoder 102 and modulates the encoded data onto a single carrier. The modulated signal is then transmitted via an antenna 108. The single carrier transmitter 100 of FIG. 5A is able to send SC packets according to the common preamble/header frame format utilizing the same hardware as the SC-Only transmitter described with reference to FIG. 2A. The single carrier transmitter 100 transmits the common preamble/header via the antenna 108 and follows the common preamble/header with a single carrier payload containing the encoded data.

FIG. 5B depicts a dual-mode transmitter 110 for transmitting packets according to the above described format. The dual-mode transmitter 110 is capable of transmitting both single carrier signals and multiple carrier signals, such as OFDM modulated signals, according to the common preamble/header format. The dual-mode transmitter 110 includes an encoder 112 that receives and encodes data 114 for transmission. In both the single carrier mode and multiple carrier mode, the common preamble/header is modulated utilizing a single carrier modulator 116 and transmitted via the antenna 118. In a single carrier mode, encoded payload data from the encoder 112 is modulated using the single carrier modulator 116 and transmitted via the antenna 118 following transmission of the common preamble/header. In a multiple carrier mode, the common preamble/header is modulated by the single carrier modulator 116 and transmitted via the antenna 118 in a similar fashion as in the single carrier mode. However, in the multiple carrier mode, the encoded payload data is modulated by the multiple carrier modulator 120 and transmitted via the antenna 118 following transmission of the single carrier common preamble/header.

Figure 2B:
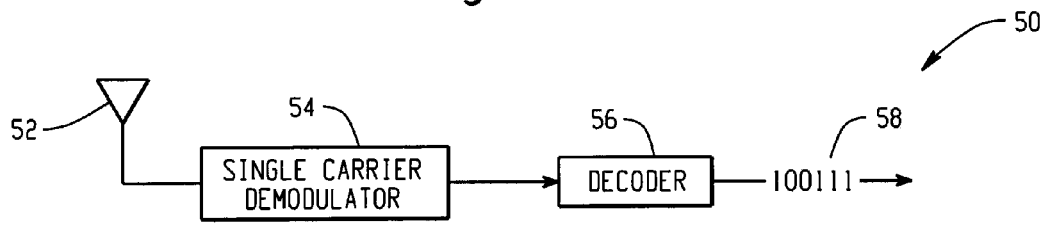
Figure 3A:
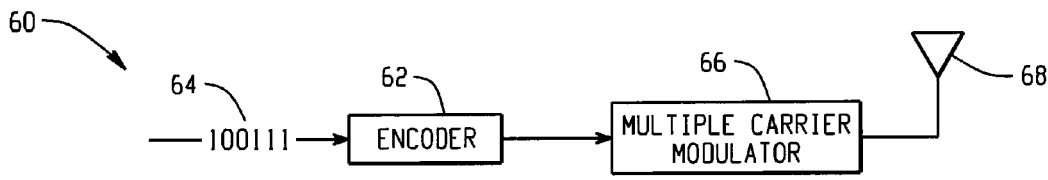
FIGS. 3A and 3B depict block diagrams of a multiple carrier transmitter and a multiple carrier receiver.
Figure 3B:
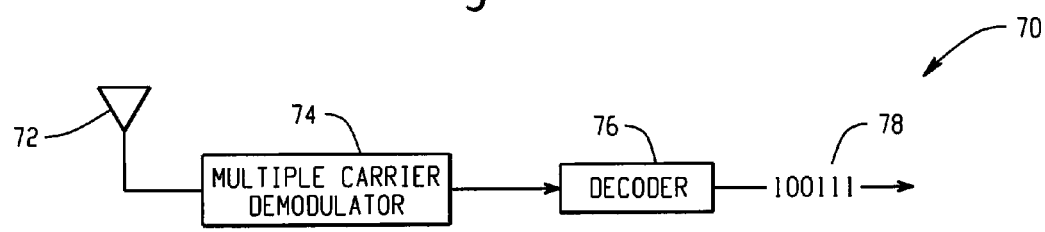
Figure 4A:
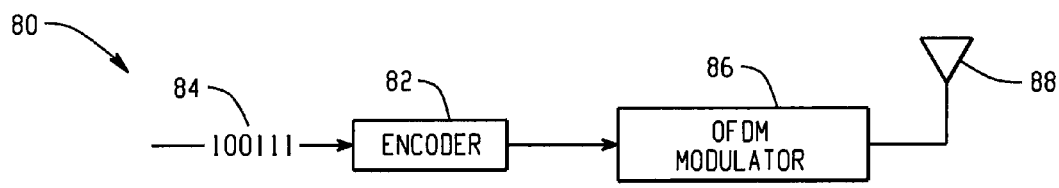
FIGS. 4A and 4B depict block diagrams of an OFDM multiple carrier transmitter and an OFDM multiple carrier receiver.
Figure 4B:
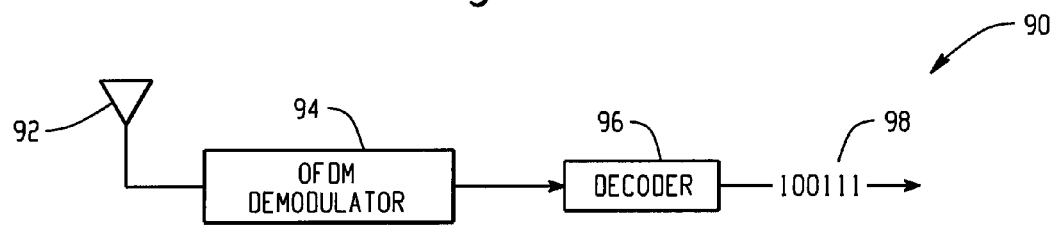
Figure 6A:
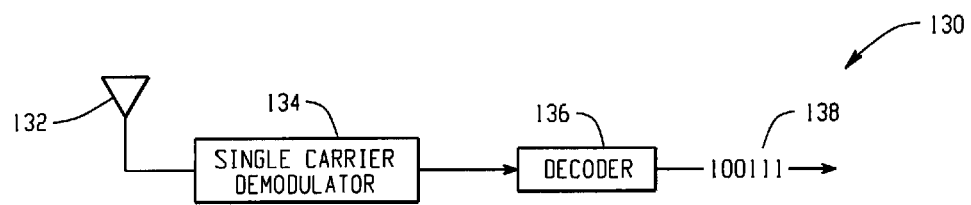
FIGS. 6A and 6B depict block diagrams of a single carrier receiver and a multiple carrier receiver that includes a packet synchronizer/header decoder.
Figure 6B:
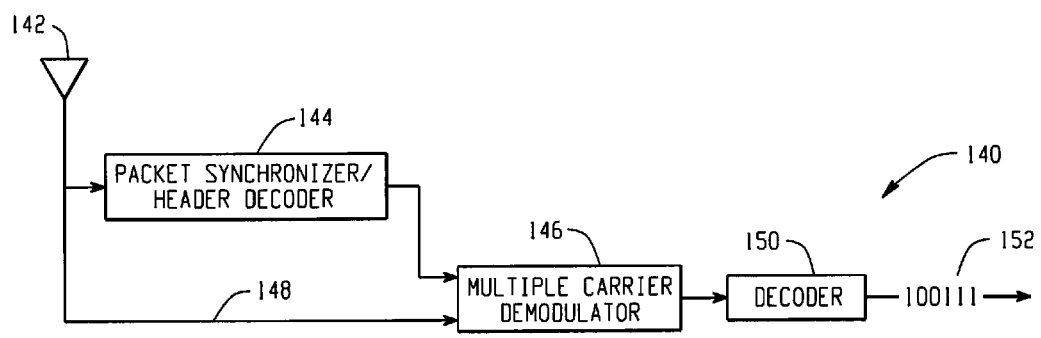

FIGS. 6A and 6B respectively depict block diagrams of a single carrier receiver 130 and a multiple carrier receiver 140 that includes a packet synchronizer/header decoder. Both of the depicted receivers are capable of understanding the single carrier common preamble/header. The receiver 130 of FIG. 6A is an SC-Only receiver similar to the receiver described with reference to FIG. 2B. The SC-Only receiver 130 receives the single carrier common preamble/header via an antenna 132 which propagates the common preamble/header to a single carrier demodulator 134 which processes the common preamble/header. The common preamble/header identifies whether the following payload portion of the packet is a single carrier signal or multiple carrier signal. If the common preamble/header identifies a single carrier payload, the single carrier demodulator 134 receives the payload via the antenna 132, demodulates the payload, and passes the demodulated payload to the decoder 136, which decodes the data 138 and makes it available to downstream circuitry. If the common preamble/header identifies a multiple carrier payload, the payload is ignored because the single carrier receiver 130 cannot process the multiple carrier payload.

As shown in FIG. 6A, the SC-only device does not need to implement an additional processing block to support multiple carrier packets. Any single carrier modulated packet is a "pure" single carrier packet that requires no additional processing. Multiple carrier packets are constructed with a single carrier modulated preamble and header, so the single carrier device can decode the header and know the duration/destination of the multiple carrier packet.

Referring to FIG. 6B, the MC-Only receiver 140 is configured to understand the single carrier common preamble/header. The MC-Only receiver 140 receives the single carrier common preamble/header via an antenna 142. The received single carrier common preamble/header is processed by a packet synchronizer/header decoder 144 that detects whether the payload portion that follows will be a single carrier signal or multiple carrier signal as well as several characteristics of the incoming payload signal. The packet synchronizer/header decoder 144 forwards these detected parameters to a multiple carrier demodulator 146. If the packet synchronizer/header decoder detects that the incoming payload portion of the packet is a single carrier signal, the payload is ignored as the multiple carrier demodulator 146 is not capable of processing the single carrier payload. However, if the common preamble/header identifies a multiple carrier payload, the multiple carrier demodulator 146 receives the payload via the antenna 142 as shown at 148, demodulates the payload, and passes the demodulated payload to the decoder 150, which decodes the data 152 and makes the data available to downstream circuitry. As shown in FIG. 6B, the MC-only receiver 140 requires only one additional, simple packet synchronization and header decoding receiver block for extracting all the physical layer information for multiple carrier demodulation/decoding.

Figure 7A:
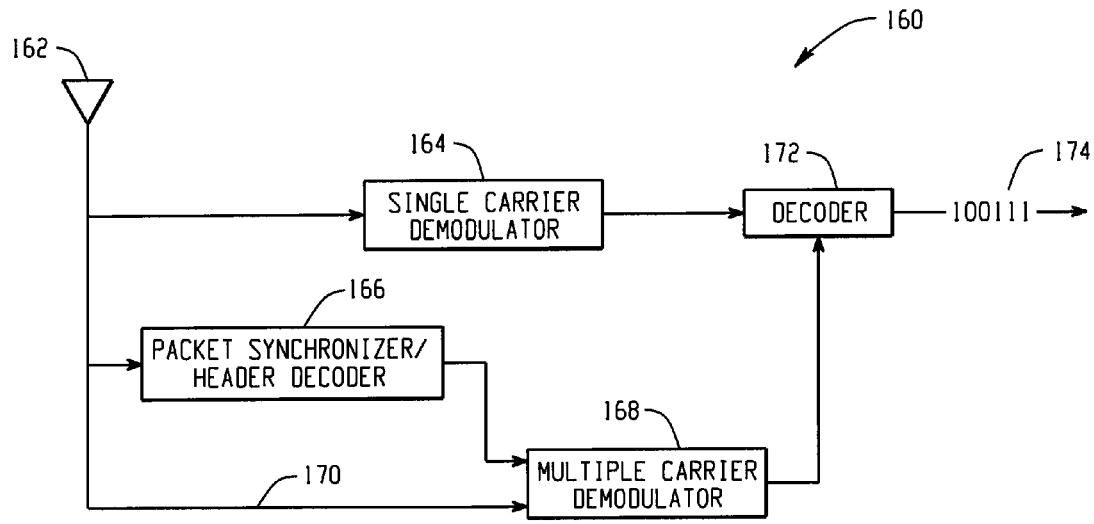
FIGS. 7A and 7B depict a dual mode receiver that includes a packet synchronizer/header decoder and a second dual mode receiver.
Figure 7B:
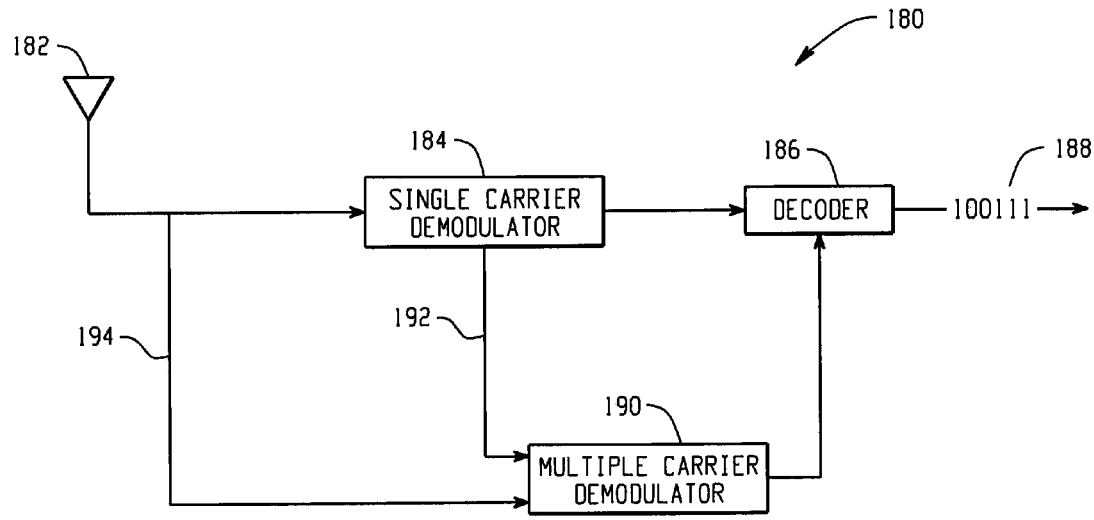

FIGS. 7A and 7B depict a dual mode receiver 160 that includes a packet synchronizer/header decoder and a second dual mode receiver 180. Both of the depicted receivers are capable of understanding the single carrier common preamble/header. The dual mode receiver 160 of FIG. 7A receives the single carrier common preamble/header via an antenna 162. The received preamble/header is propagated to a single carrier demodulator 164 and a packet synchronizer/header decoder 166. Both the single carrier demodulator 164 and the packet synchronizer/header decoder 166 process the received preamble/header to detect whether the following payload will arrive via a single carrier signal or a multiple carrier signal and to determine parameters of the signal and payload. If the incoming payload is a single carrier payload, the single carrier demodulator 164 extracts the payload from the single carrier signal and passes the payload to the decoder 172 which makes the decoded data 174 available to downstream circuitry. If the incoming payload is a multiple carrier payload, the packet synchronizer/header decoder 166 forwards parameters of the incoming signal and payload to the multiple carrier demodulator 168. The multiple carrier demodulator 168 receives the multiple carrier signal as shown at 176 and extracts the payload from the multiple carrier signal. The extracted payload is then propagated to the decoder 172 which makes decoded data 174 available to downstream circuitry.

Referring to FIG. 7B, the dual mode receiver 180 receives the single carrier common preamble/header via an antenna 182. The common preamble/header is processed by the single carrier demodulator 184 which detects whether the incoming payload portion of the packet is a single carrier signal or multiple carrier signal. If the incoming payload is a single carrier signal, the single carrier demodulator 184 extracts the payload and passes the payload data to a decoder 186 which makes the decoded data 188 available to downstream circuits. If the incoming payload is a multiple carrier signal, the single carrier demodulator alerts the multiple carrier demodulator 190 and passes along parameters of the incoming payload and signal as shown at 192. The multiple carrier demodulator 190 receives the incoming multiple carrier payload as shown at 194. The multiple carrier demodulator 190 extracts the payload from the multiple carrier signal and forwards the payload to the decoder 186 that makes the decoded data 188 available to downstream circuitry.

As illustrated above, the MC-Only and dual mode receivers require only a small amount of additional hardware to handle the modified packet format. The receivers may require two sets of sampling clocks that come from the same source clock. Alternatively, the receiver may sample using the multiple carrier higher clock rate all through the packet and apply digital interpolation for the lower clock rate segments. The receivers utilize the preamble information for determining carrier sense, frequency offset, timing reference, AGC/ADC setting, and single carrier channel impulse estimation (at least for demodulating the header).

Utilizing the above described or similar transmitters and receivers, coexistence between single carrier and multiple carrier hardware may be supported. Even if the modulation format of the incoming packet is not supported, an SC-Only or MC-Only device may delay its own transmissions by understanding the preamble/header to avoid collisions. Coexistence may be guaranteed by transmitting the single carrier common preamble/header at a low rate such that all devices in the network can understand.

Figure 8:
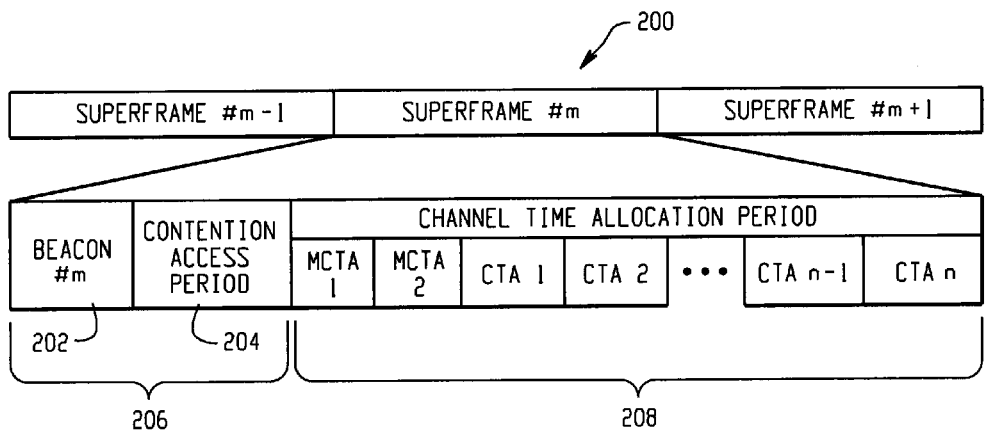
FIG. 8 depicts a superframe structure for IEEE 802.15.3c MAC.

FIG. 8 depicts a superframe structure 200 for IEEE 802.15.3c MAC. In this structure 200, the beacon portion 202 and the contention access period portion 204 make up the preamble/header portion 206 that is transmitted using a single carrier signal transmitted at a low common data rate. This preamble/header portion identifies whether the payload portion 208 transmitted during the channel time allocation period will be transmitted via a single carrier signal or multiple carrier signal as well as parameters of the coming payload and signal such as the physical layer demodulation/decoding information of the payload portion. A receiver determines the characteristics of the incoming payload portion 208 of the signal and properties of the incoming signal to prepare for receipt and demodulation of the signal.

Figure 9:
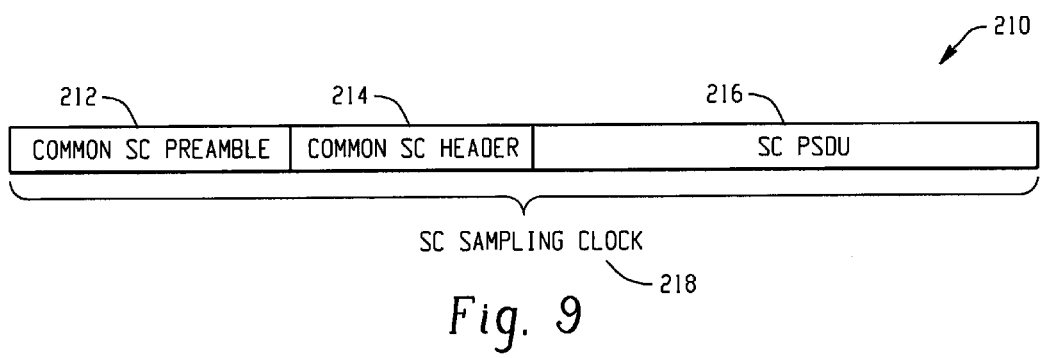
FIG. 9 depicts a single carrier modulated packet.
Figure 10:
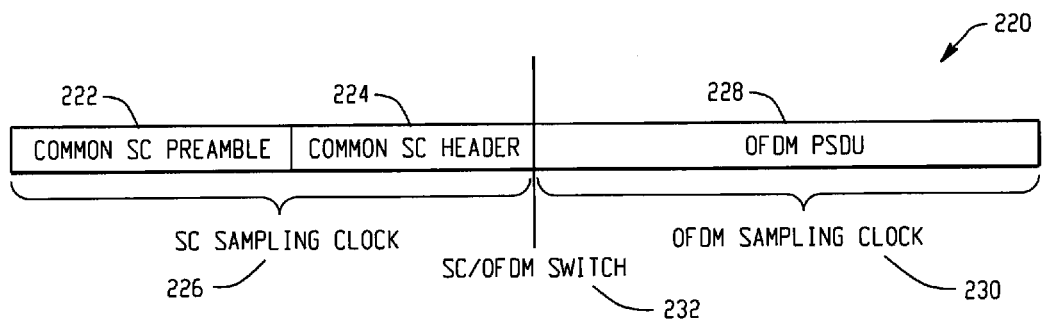
FIG. 10 depicts an OFDM multiple carrier modulated packet.
Figure 11:
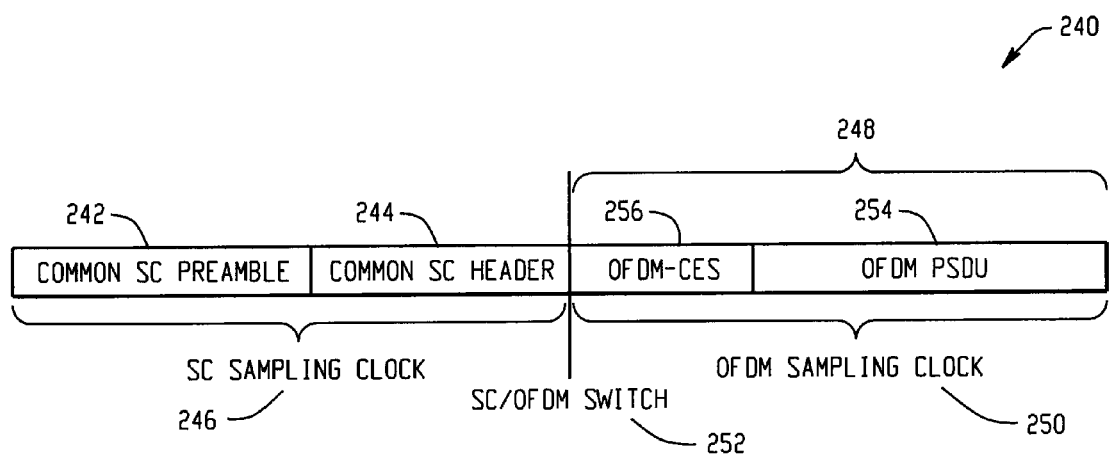
FIG. 11 depicts an OFDM multiple carrier modulated packet that includes an OFDM channel estimation sequence.

FIGS. 9-11 depict example frames that contain common single carrier preambles/headers. FIG. 9 depicts a single carrier modulated packet 210. The single carrier modulated packet 210 begins with a common single carrier preamble 212 followed by a common single carrier header 214. The single carrier preamble/header portions 212, 214 are followed by a single carrier physical service data unit (PSDU) 216 that may also be referred to as a single carrier payload portion 216. As illustrated at 218, the entire single carrier modulated packet 210 may be sampled at the receiver by the same single carrier sampling clock.

FIG. 10 depicts an OFDM multiple carrier modulated packet 220 that includes a single carrier preamble/header portion. The packet begins with a common SC preamble 222 and a common single carrier header 224. The common single carrier preamble/header portions 222, 224 may be sampled by the single carrier sampling clock as indicated at 226. The common single carrier preamble/header portions 222, 224 are followed by an OFDM PSDU payload portion 228. This multiple carrier payload portion 228 may be sampled by a higher rate OFDM sampling clock as indicated at 230. This change in sampling rate from the slower single carrier sampling clock 226 to the OFDM sampling clock 230 introduces a clock switch 232 which may be addressed as will be discussed herein below.

FIG. 11 depicts an OFDM multiple carrier modulated packet 240 that includes an OFDM channel estimation sequence. The packet begins with a common single carrier preamble 242 and a common single carrier header 244. The common single carrier preamble/header portions 242, 244 may be sampled by the single carrier sampling clock as indicated at 246. The common single carrier preamble/header portions 242, 244 are followed by an OFDM payload portion 248. The OFDM payload portion 248 may be sampled by a higher rate OFDM sampling clock as indicated at 250. This change in sampling rate from the slower single carrier sampling clock 246 to the OFDM sampling clock 250 introduces a clock switch 252 as was described with reference to FIG. 10. The payload portion 248 of the OFDM packet 240 includes the PSDU data portion 254 as well as an OFDM channel estimation sequence (CES) portion 256. The CES portion 256 enables an OFDM demodulator to further calibrate for the incoming data portion 254 of the packet as will be described further herein below.

Figure 1:
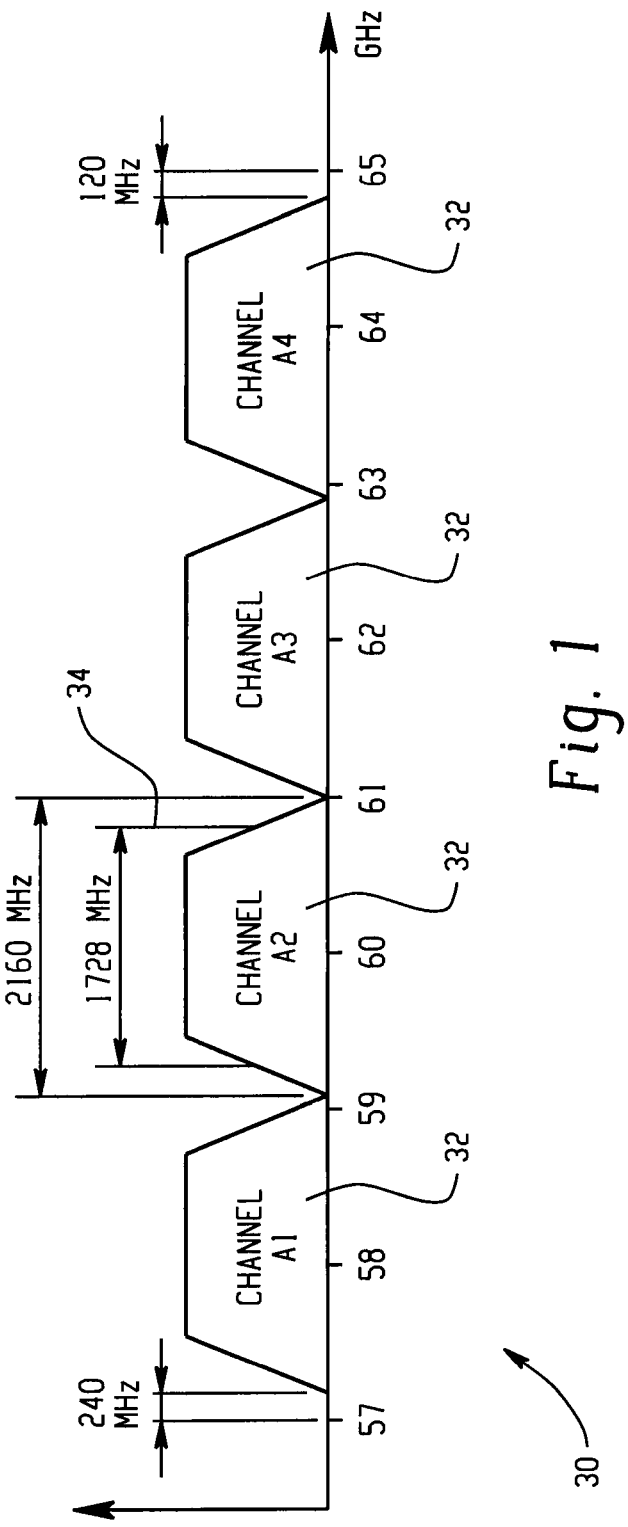
FIG. 1 depicts an example 60 GHz frequency channel plan.

As noted with reference to FIGS. 10 and 11, the single carrier and multiple carrier portions of a packet may be sampled at different rates to take advantage of benefits and limitations of the different modulation schemes. To avoid out-of-band emission and to fulfill the channel plan (e.g., as shown in the 60 GHz 802.15.3c plan depicted in FIG. 1), single carrier signals may be transmitted with a sampling clock rate (bandwidth) lower than the overall bandwidth of the assigned bandwidth. This is shown in FIG. 1 at 34 where the single carrier baseband signal is sampled using a clock of 1.728 GHz. Advanced baseband/analog pulse shape filtering may also be applied on the SC modulated baseband signal to further reduce out-of-band emissions and to maintain the spectrum mask defined by the wireless standard.

In contrast, multiple carrier signals, such as OFDM, may be transmitted using a higher bandwidth and guard subcarriers (null tones) at the edges of the inband tones to limit out-of-band emission and maintain the spectrum mask. For example, the OFDM baseband signal may be sampled using a clock rate of 2.592 GHz, which is 1.5 times the single carrier sampling rate. In an OFDM signal, pulse shape filtering is easier to realize due to low subcarrier bandwidth and the presence of guard subcarriers. This pulse shape filtering may be accomplished using time domain tapering equivalent to frequency domain convolution, or time domain convolution maybe used.

Figure 12:
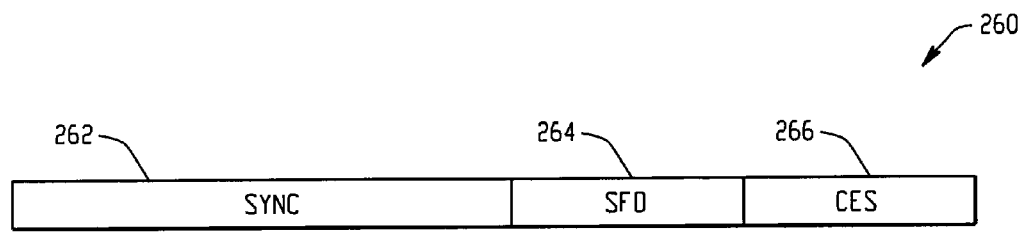
FIG. 12 depicts a common single carrier preamble.

FIG. 12 depicts a common single carrier preamble portion 260. The common single carrier preamble portion 260 begins with a signaling portion 262 followed by a frame delimiter sequence (SFD) 264. A signaling portion may include a synchronization portion, a channel estimation portion, and/or a header portion. The frame delimiter sequence 264 may be followed by a single carrier channel estimation sequence 266.

The synchronization subfield 262 contains signals for synchronizing a receiver with an incoming packet. The synchronization subfield 262 may contain spreading sequences, such as a Golay sequence of length 128, having pi/2 BPSK modulation (or any other modulation that spreads energy equally in real and imaginary parts of the baseband signal) that are concatenated repeatedly to help achieve synchronization. The signaling portion 262 may additionally or alternatively contain cover sequences that are spread using a spreading sequence. Different cover sequences may be used for signaling a receiver about various parameters such as a piconet ID or header rate. Different cover sequences may also be used to signal the receiver as to whether single carrier modulation or multiple carrier modulation will be applied to the data payload. If this data is included in the signaling portion 262, then the receiver may discover the single carrier/multiple carrier mode at the very beginning of the packet, so that the receiver may set receiving physical layer parameters, such as ADC headroom, ADC precision, AGC gain targets, specific for receiving single carrier data or multiple carrier data. Similarly, different spreading sequences may be used to signal the receiver whether single carrier modulation or multiple carrier modulation will be applied to modulate the data payload (e.g., the use of different or a pair of complementary Golay sequences identifies the format of the data payload portion). Additionally, carrier sensing, carrier frequency offset, AGC/ADC setting, and timing reference may be determined based on the synchronization subfield. Similarly, different cover sequences in the SFD portion of the preamble or different spreading sequences in the CES portion of the preamble may be used to signal the receiver as to whether single carrier modulation or multiple carrier modulation will be applied to modulate the data payload.

The frame delimiter sequence 264 is a sequence that establishes frame timing such as the Golay sequence using pi/2 BPSK as in the 802.15.3c draft standard 2.0. The channel estimation sequence 266 is a sequence known to the receiver for single carrier and/or multiple carrier channel estimation such as long complementary Golay sequences with pi/2 BPSK as in the 802.15.3c draft standard 2.0.

Figure 13:
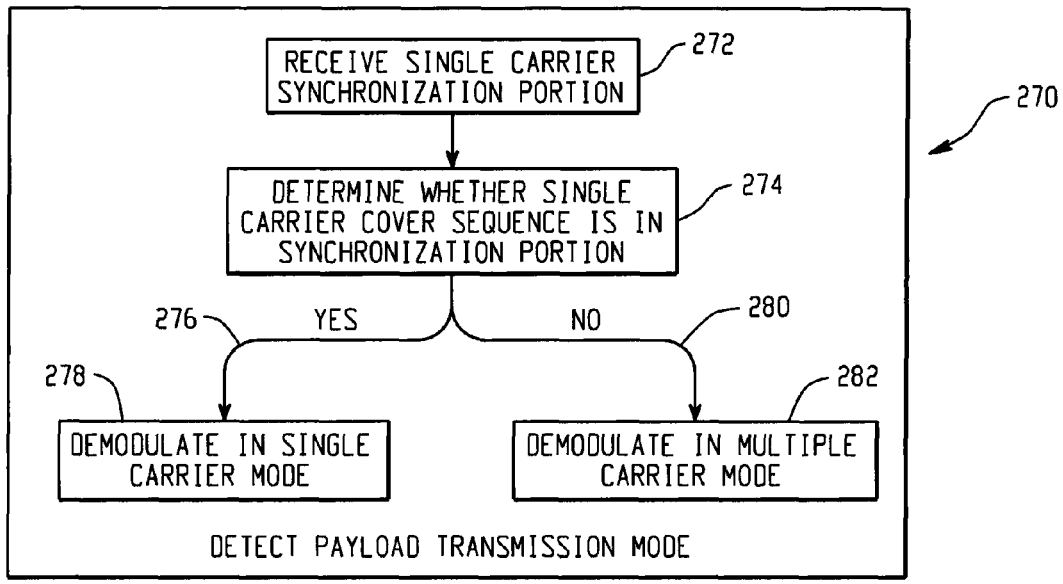
FIG. 13 is a flow diagram depicting detection of a payload transmission mode based on a carrier cover sequence.

FIG. 13 is a flow diagram depicting detection of a payload transmission mode based on a single carrier cover sequence. A dual mode receiver receives a single carrier signaling portion of a packet as shown at 272. A determination is made at 274 as to whether a single carrier cover sequence is present within the signaling portion that identifies that the following data payload portion will be a single carrier signal. If the single carrier data payload cover sequence is in the single carrier signaling portion, the yes branch 276 is taken and the payload portion is demodulated and decoded in a single carrier mode as shown at 278. If the single carrier data payload cover sequence is not in the single carrier signaling portion, then the incoming data payload will be a multiple carrier signal and the no branch 280 is taken. The payload portion is then demodulated and decoded in a multiple carrier mode as shown at 282. Alternatively, the presence of different cover sequences in the SFD portion may be utilized to detect single carrier or multiple carrier payload portion transmission.

Figure 14:
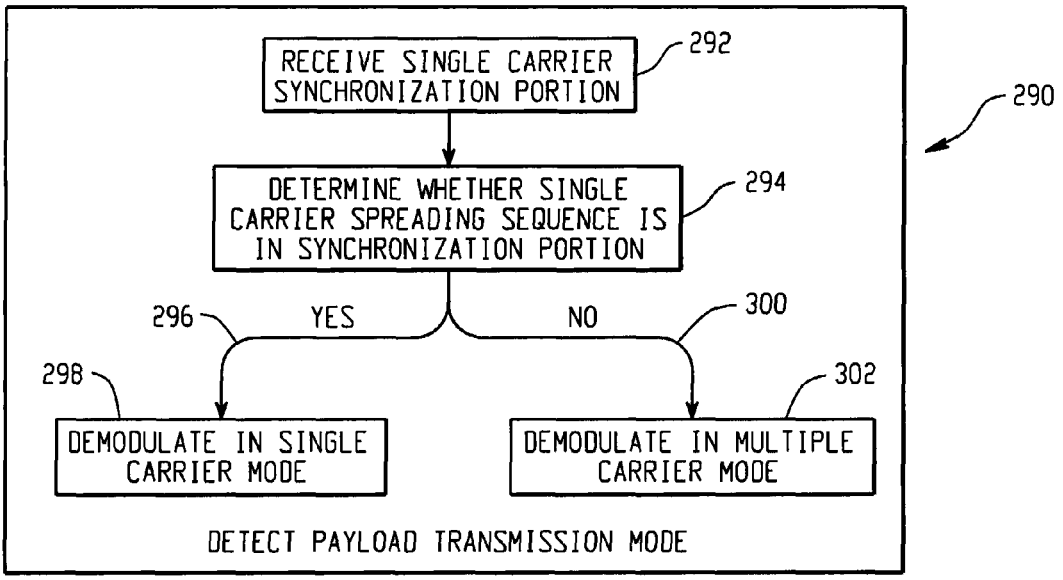
FIG. 14 is a flow diagram depicting detection of a payload transmission mode based on a carrier spreading sequence.

FIG. 14 is a flow diagram depicting detection of a payload transmission mode based on a carrier spreading sequence. A dual mode receiver receives a single carrier signaling portion of a packet as shown at 292. A determination is made at 294 as to whether a single carrier spreading sequence is present within the signaling portion that identifies that the following data payload portion will be a single carrier signal. If the single carrier data payload spreading sequence is in the single carrier signaling portion, the yes branch 296 is taken and the payload portion is demodulated and decoded in a single carrier mode as shown at 298. If the single carrier data payload spreading sequence is not in the single carrier signaling portion, then the incoming data payload will be a multiple carrier signal and the no branch 300 is taken. The payload portion is then demodulated and decoded in a multiple carrier mode as shown at 302. Alternatively, different spreading sequences in the CES portion may be utilized for signaling single carrier or multiple carrier payload portion transmission.

Figure 15:
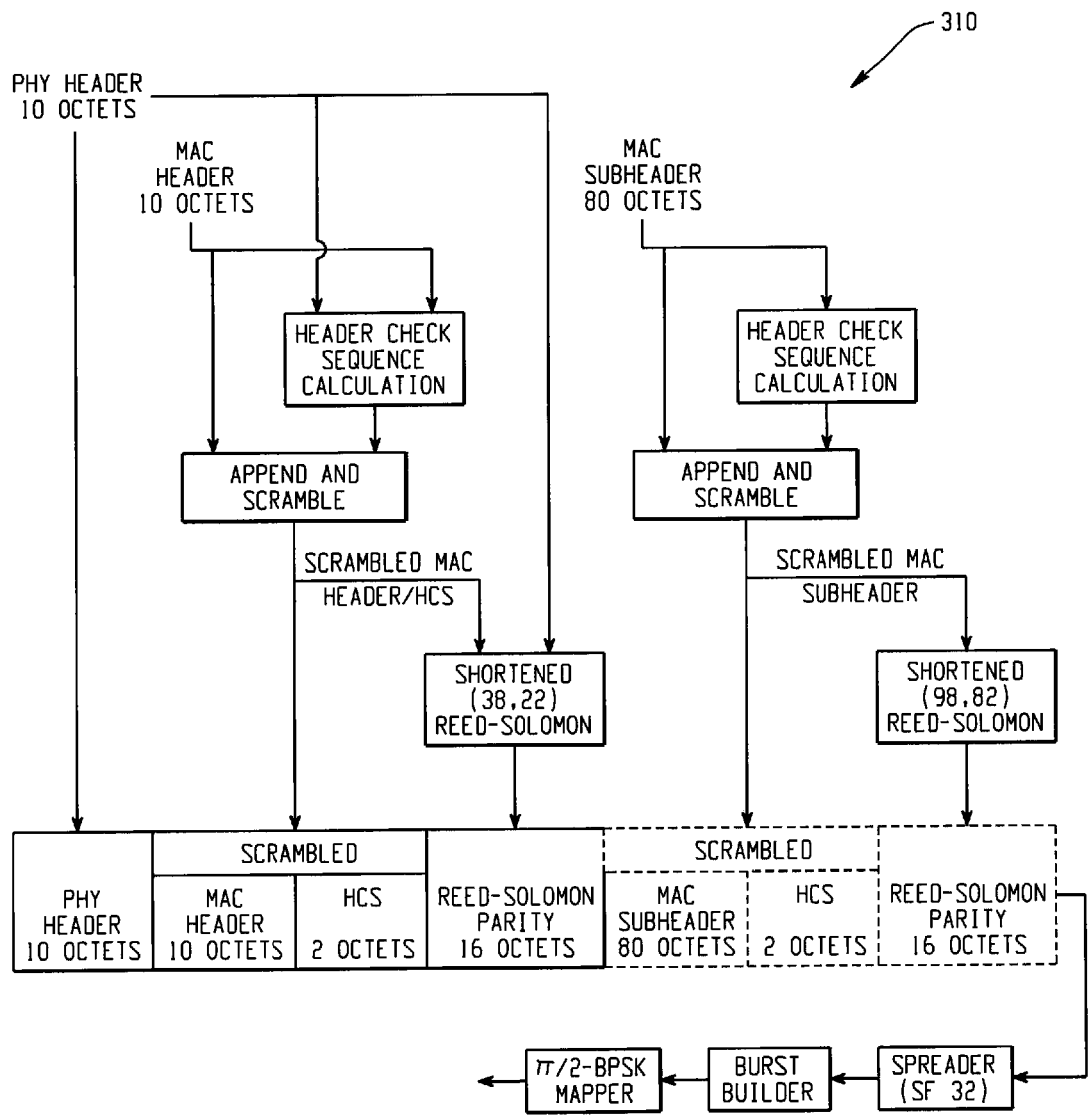
FIG. 15 depicts a common single carrier header.

FIG. 15 depicts an example common single carrier header 310. The single carrier modulated header contains all of the necessary physical layer demodulation/decoding information, such as packet length, pilot insertion information, cyclic prefixes, for both single carrier packets and multiple carrier packets and may contain the MAC layer header. The receiver may obtain MAC header information even if the MAC content in the payload portion is not decodable, due to an unsupported mode, because all receivers are able to interpret the single carrier header portion. To increase reliability of header decoding, the common single carrier header 310 may be transmitted at a low data rate. The header illustrated in FIG. 15 is in compliance with the 802.15.3c draft 2.0 standard.

As noted with reference to FIGS. 10 and 11, a multiple carrier payload packet that begins with a single carrier preamble/header portion may include a jump in sampling frequency between the single carrier portion and multiple carrier portion. This jump may require some compensation at the transmitters and/or receivers to coherently demodulate and decode the payload portions.

A first compensation that may be required is compensation to maintain coherence in carrier frequency at the switch. To accomplish coherence in the carrier frequency, the transmitter uses the same carrier frequency across a multiple carrier payload packet's single carrier and multiple carrier segments. The same source baseband clock is applied across the two segments at the transmitter, where a lower sampling rate for generating the single carrier portion of the baseband signal may be realized through interpolation.

Another compensation that may be required is compensation to maintain coherence in carrier phase at the switch. Spectrum mask/out-of-band transmissions may be controlled for the single carrier and multiple carrier segments of a multiple carrier payload packet through the use of pulse shaping filters. The phase change at the SC/MC switch point may cause a large out-of-band emission if the phase difference between the last symbol of the single carrier header and the first sample of the multiple carrier payload portion is large.

One solution is to multiply the whole multiple carrier segment by the phasor of the last symbol of the single carrier header or by a phasor with a phase close to the phase of the header's last symbol. For example, if the header is modulated using pi/2 BPSK and the number of symbols in the header is a multiple of 4, then the last symbol is +/−j. Thus, compensation may be achieved by multiplying the multiple carrier segment by j if the last symbol is j or by −j if the last symbol is −j.

Figure 16:
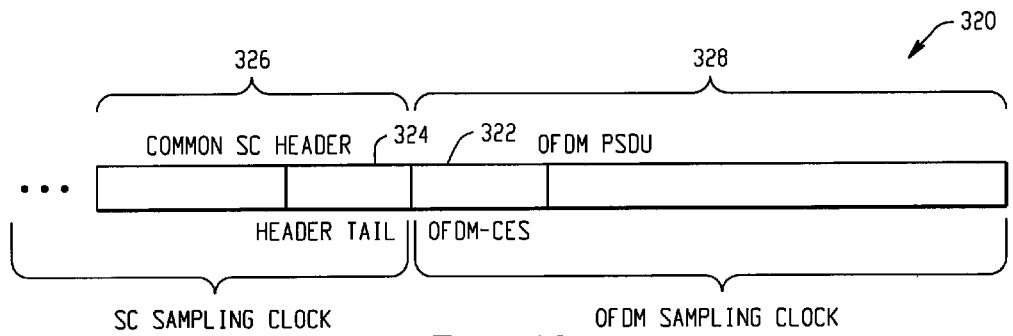
FIG. 16 depicts an OFDM multiple carrier modulated packet that includes an OFDM channel estimation sequence and a header tail in the common single carrier header.

A second solution is depicted in FIG. 16. FIG. 16 depicts a portion of an OFDM MC modulated packet 320 that includes an OFDM channel estimation sequence 322 and a header tail 324 in the common single carrier header 326. The single carrier header portion 326 includes a tail subfield at the end of the header (e.g., 4 ones with pi/2 BPSK modulation, so that the last symbol is −j). The OFDM MC payload portion 328 of the packet 32 then includes a multiple carrier CES symbol 322 at the beginning of payload portion (e.g., the OFDM-CES subfield that may be used for OFDM channel estimation refinement). The out-of-band emissions may be minimized by designating the last symbol of the header tail 324 such that it contains a small phase shift to the first OFDM-CES symbol. The small phase shift between the selected final header tail 324 symbol and the known beginning of the OFDM-CES enables elimination of the spurious out-of-band emissions caused by larger phase shifts at the boundary.

Another compensation that may need to be implemented for successful transition from the single carrier to multiple carrier portions of a single carrier payload packet having a single carrier preamble/header is compensation to maintain coherence in power at the switch. The single carrier and multiple carrier segments may need to be transmitted with the same power. To compensation for this coherence of power across the single carrier segment and multiple carrier segments, the receiver AGC may be appropriately set based upon parameters determined from the signaling portion of the common single carrier preamble.

The jump from single carrier sampling to multiple carrier sampling may also require compensation to ensure coherence in timing. For example, in the case of 802.15.3c, OFDM is sampled at 1.5 times the rate of SC. In other words, the time duration for two clock cycles of the single carrier portion is the same time as the duration for 3 clock cycles of the OFDM portion. In the example of 802.15.3c, to help ensure a successful change from single carrier to OFDM, the time alignment should be guaranteed at each 2 cycle boundary of the single carrier clock. Interpolation may be used for converting the clock rates from the same source clock.

Figure 17:
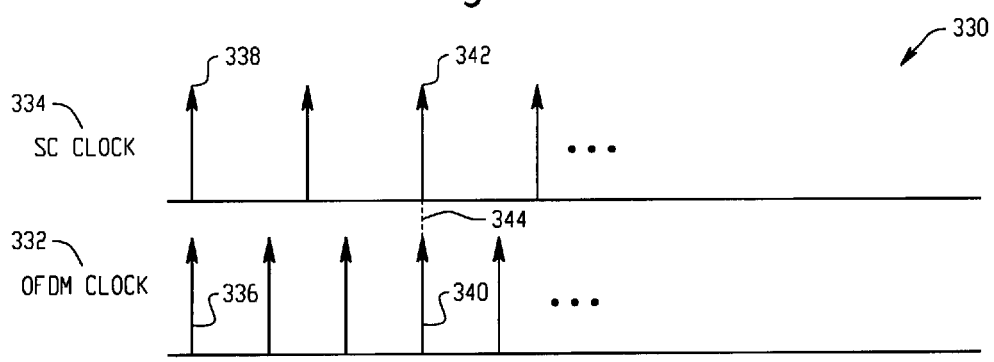
FIG. 17 depicts sample timing where the OFDM clock samples at 1.5 times as fast as a single carrier clock.

FIG. 17 depicts sample timing where the OFDM clock 332 samples at 1.5 times as fast as a single carrier clock 334. The clocks are aligned such that a first pulse 336 of the OFDM clock 332 is aligned with a first pulse 338 of the single carrier clock 334, and a fourth pulse 340 of the OFDM clock 332 is aligned with a third pulse 342 of the single carrier clock 334 as shown at 344.

Figure 18:
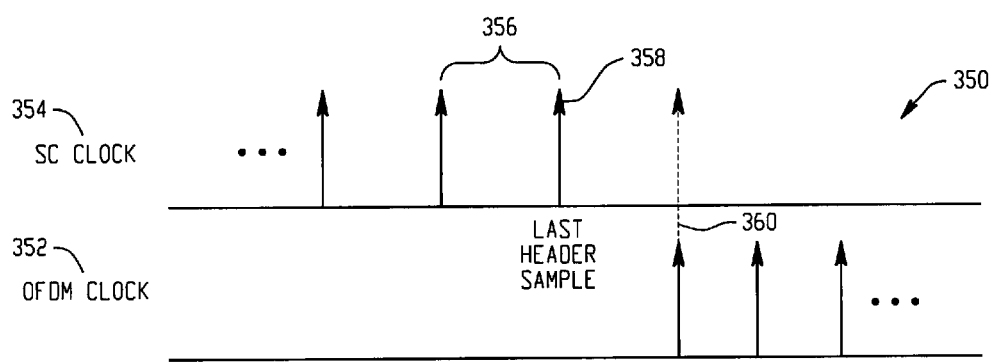
FIG. 18 depicts sample timing where the OFDM clock samples at 2 times as fast as a single carrier clock.

FIG. 18 depicts sample timing where the OFDM clock 352 samples at 2 times as fast as a single carrier clock 354. In the example of FIG. 18, the OFDM clock 352 begins one single carrier pulse width 356 after the last single carrier header sample 358 as shown at 360. Alternatively, the OFDM clock could run continuously in a similar fashion as shown in FIG. 17, where a first OFDM pulse would align with a first single carrier pulse and a third OFDM pulse would align with a second single carrier pulse.

As described above, in a single carrier packet containing a single carrier preamble/header portion, the receiver may rely on a CES in the single carrier portions as described with reference to FIG. 12, or the MC portion of the packet may contain an SC-CES sub-portion as described with respect to FIG. 11. In the case where the receiver uses the information of the SC-CES portion to perform both single carrier and MC channel estimation for both single carrier preamble/header and MC payload demodulation, a coherent spectrum may be kept across the switch from single carrier to multiple carrier.

The SC-CES usually derives a channel impulse response with high accuracy due to the processing gain sampled at the single carrier sampling rate. Using the SC-CES, multiple carrier frequency domain (per-sub-carrier) channel estimation may be obtained by over-sampling the estimated channel response to the multiple carrier clock rate and performing a fast-Fourier transform (FFT) on the detected samples. The FFT may be applied directly on the time-domain channel estimate, and the resultant frequency domain channel estimate may be downsampled (e.g., to 352 (336+16) tones). To utilize the SC-CES for multiple carrier channel estimation, the frequency response for single carrier and multiple carrier may need to be near identical to guarantee the quality of the multiple carrier channel estimate.

An equivalent channel is the combination of the over-the-air channel, analog filters at the transmitter and receiver, and digital (pulse shaping) filters at the transmitter and receiver. The over-the-air channel and analog filters at the transmitter and receiver are often common between the single carrier and multiple carrier segments. However, the digital filters may be different based on design requirements of the single carrier and multiple carrier segments.

Figure 19:
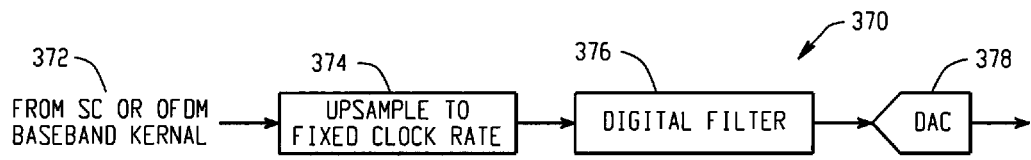
FIG. 19 depicts a transmitter configuration for maintaining a coherent spectrum between a single carrier portion and a multiple carrier portion of a received signal.

A first mechanism for maintaining a coherent spectrum across the single carrier and multiple carrier portions of a packet is to have the single carrier and multiple carrier segments utilize the same digital filter at the transmitter using the same sampling rate. FIG. 19 depicts a transmitter configuration for maintaining a coherent spectrum between a single carrier portion and an OFDM or other multiple carrier portion of a received signal. To accomplish this, both segments 372 may be upsampled to the same rate, as shown at 374, and then the same digital filter is applied 376 before entering a digital-to-analog converter (DAC) 378.

A second mechanism is to predetermine and fix digital pulse shaping filters for the single carrier and multiple carrier segments such that their frequency responses (amplitude and phase) on different subcarriers are known by both the transmitter and receiver. While filter amplitudes are often flat over the data subcarriers, this second mechanism may limit implementation flexibility.

Figure 20:
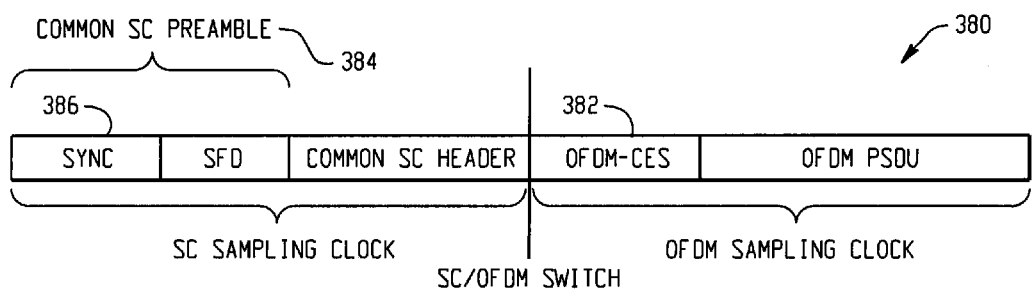
FIG. 20 depicts an OFDM multiple carrier modulated packet that includes an OFDM channel estimation sequence that does not include a single carrier channel estimation sequence.

In addition to using the SC-CES to perform channel estimation for the multiple carrier portion of the packet, the multiple carrier portion of the packet may contain its own MC-CES. In cases where channel estimation is performed using an MC-CES, compensation to maintain a coherent spectrum as described above is not necessary. In addition, if an MC-CES is utilized and the packet is a multiple carrier payload packet, transmission of the SC-CES may not be necessary. FIG. 20 depicts an OFDM multiple carrier modulated packet 380 that includes an OFDM channel estimation sequence 382 that does not include a single carrier channel estimation sequence. This is shown at 384 where the common single carrier preamble does not contain a CES sub-portion. This can be contrasted with the example common single carrier preamble described with reference to FIG. 12 above.

The SC-CES may still need to be applied for packets having a single carrier payload. The receiver may be configured to be able to tell whether a single carrier payload is forthcoming, and thus whether an SC-CES is coming, based on the signaling portion 386 of the common single carrier preamble 384. If the SC-CES is not transmitted, the receiver may use the signaling portion 386 of the common single carrier preamble 384 to determine single carrier channel estimation (e.g., by adaptive training as in 802.11b), so that the header can still be correctly decoded. Because the header may be spread using a high spreading factor, it may be robust against channel estimation inaccuracies that might be caused by removing the SC-CES.

As an additional example, the SC-CES and an MC-CES may be transmitted in a multiple carrier payload packet. A first channel estimate may be calculated for the entire packet based on the SC-CES sub-portion. A second channel estimate may also be calculated based on the received MC-CES sub-portion of the multiple carrier payload portion. Both of these first and second channel estimates may be utilized to generate a final channel estimate that is used in processing the multiple carrier payload portion.

Figure 21:
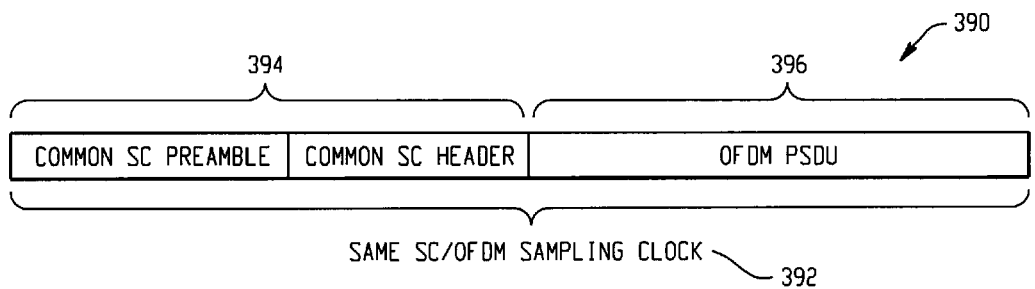
FIG. 21 depicts an OFDM multiple carrier modulated packet that is sampled at the same rate throughout the single carrier and multiple carrier portions.

FIG. 21 depicts an additional example where an OFDM multiple carrier packet 390 is sampled at the same rate 392 throughout the SC 394 and MC 396 portions. In this example, the SC 394 and MC 396 portions of the packet utilize the same sampling rate throughout. For example, both the SC 394 and MC 396 portions of the packet may be sampled at about a 2 GHz rate (e.g., 1.95 GHz to 2.05 GHz). Both portions may fulfill the spectrum mask defined by the regulation authority through appropriate digital and analog filtering. In this case no sampling rate switching is required between the SC and OFDM portions. Utilizing a common sample rate for both single and multiple carrier packets improves the ease of coexistence, as each device needs only to implement one set of demodulation/decoding schemes for receiving the preamble/header. The non-appearance of the sampling rate jump between the single carrier portion and OFDM portion of the packet mitigates the need for several of the compensations described above. Additionally, if the same digital filter is applied throughout the transmitted packet at the transmitter, the SC-CES may be used for channel estimation throughout the entire packet. Thus, the OFDM-CES may not be needed, further improving physical layer efficiency. As an alternative, an OFDM-CES may be used without use of an SC-CES. As a further alternative, both an SC-CES and OFDM-CES may be used to gain reliability.

Figure 22:
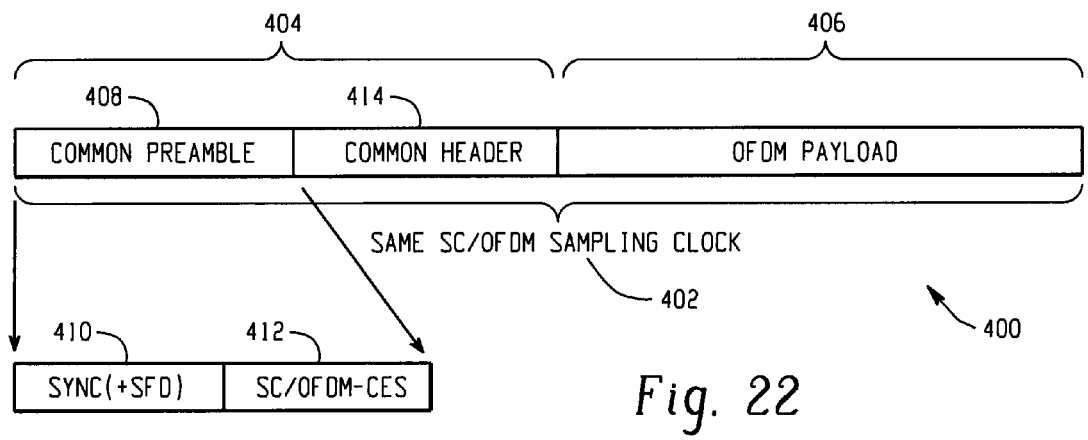
FIG. 22 depicts a common preamble portion of an OFDM multiple carrier packet that is sampled at the same rate throughout the SC and MC portions.

FIG. 22 depicts a common preamble portion 408 of an OFDM multiple carrier packet 400 that is sampled at the same rate 402 throughout the SC 404 and MC 406 portions. The common preamble 408 includes a single carrier synchronization portion 410 that includes a frame delimiter sequence. The common preamble 408 also includes a common (SC/OFDM) channel estimation sequence 412. The SC/OFDM CES 412 is a channel estimation sequence that can be used for the channel estimation of single carrier and/or OFDM signals in the payload and/or the header 414.

Figure 23:
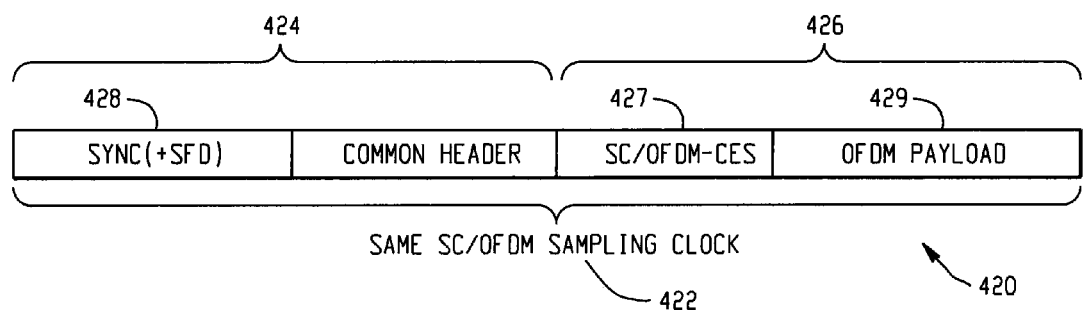
FIG. 23 depicts an OFDM multiple carrier packet that is sampled at the same rate throughout the SC and MC portions where an OFDM channel estimation sequence is included at the start of the MC portion.

FIG. 23 depicts an OFDM multiple carrier packet 420 that is sampled at the same rate 422 throughout the SC 424 and MC 426 portions where an OFDM channel estimation sequence 427 is included at the start of the MC portion 426. The OFDM CES 427 may not be included in SC payload packets. For example, an SC payload packet may utilize the contents of the SYNC portion 428 of the SC portion for gaining sufficient SC channel estimation. The packet 420 concludes with an OFDM payload portion 429.

Figure 24:
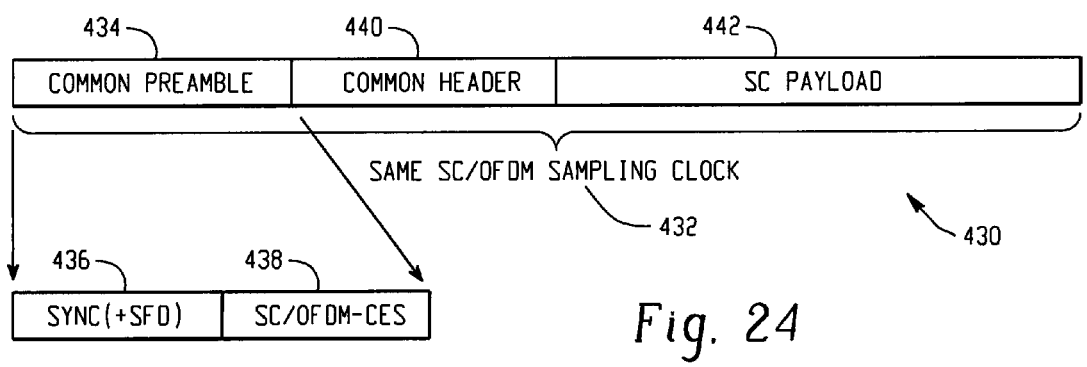
FIG. 24 depicts a single carrier packet that is transmitted at a common SC/OFDM sampling rate.

FIG. 24 depicts a single carrier packet 430 that is transmitted at a common SC/OFDM sampling rate 432. The single carrier packet 430 depicted in FIG. 24 is the single carrier modulation version of the nearly identical multiple carrier packet of FIG. 22. The single carrier packet 430 includes a common preamble 434 that includes a synchronization portion 436 as well as a common SC/OFDM channel estimation sequence 438. The single carrier packet 430 further includes a common header 440 and an SC payload 442.

Figure 25:
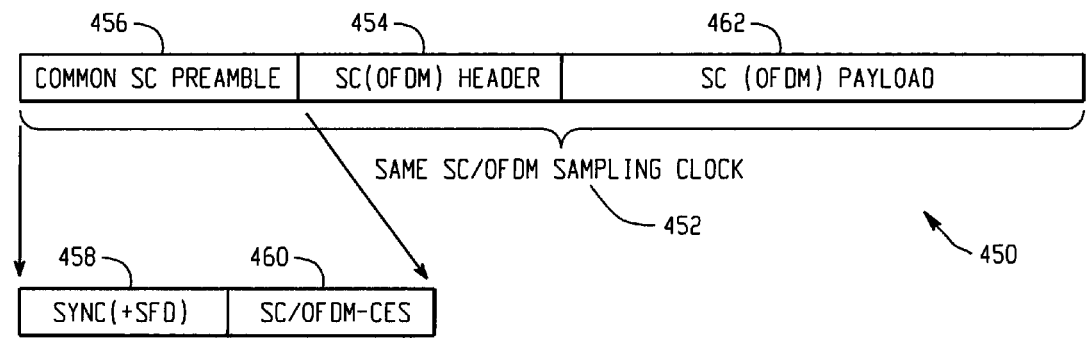
FIG. 25 depicts a data packet transmitted at a common SC/OFDM sampling rate having a transmission mode dependent header.

FIG. 25 depicts a data packet 450 transmitted at a common SC/OFDM sampling rate 452 having a transmission mode dependent header 454. The packet 450 includes a common SC preamble 456 that contains a synchronization portion 458 and a common SC/OFDM channel estimation sequence 460. After the common preamble 456, a transmission mode dependent header 454 is transmitted. The header 454 is either an SC header or an OFDM modulated header based on the payload 462 modulation format (i.e., SC payload goes with SC header; OFDM payload goes with OFDM header).

Figure 26:
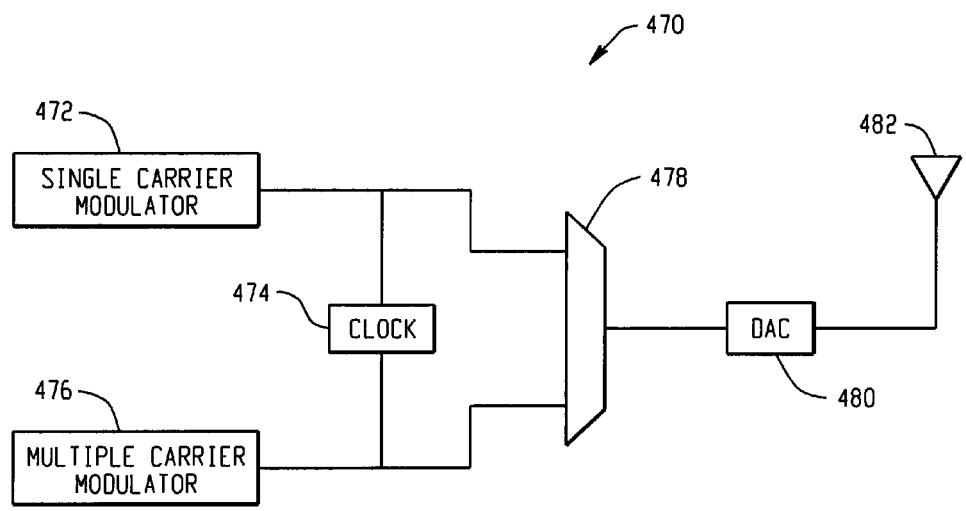
FIG. 26 depicts a dual-mode transmitter configured to transmit a data packet at a common SC/OFDM sampling rate.

FIG. 26 depicts a dual-mode transmitter 470 configured to transmit a data packet at a common SC/OFDM sampling rate. The transmitter 470 includes a single carrier modulator 472 for modulating single carrier portions of a data packet including at least a common preamble as well as a single carrier payload when the transmitter 470 is in a single carrier packet mode. An output of the single carrier modulator 472 is sampled according to an output of a common clock 474. The transmitter also includes a multiple carrier modulator 476 for modulating multiple carrier portions of a data packet that include a multiple carrier payload when the transmitter 470 is in a multiple carrier packet mode. An output of the multiple carrier modulator 476 is also sampled according to an output of the common clock 474 such that signals from the single carrier modulator 472 and the multiple carrier modulator 476 are sampled at the same data rate (e.g., ~2 GHz). A multiplexer 478 selects from between the sampled single carrier modulator 474 output and the sampled multiple carrier modulator 476 output (e.g., at the transition between a single carrier common preamble/header and multiple carrier payload). The selected signal is processed at a digital to analog converter 480 and transmitted wirelessly via an antenna 482.

Figure 27A:
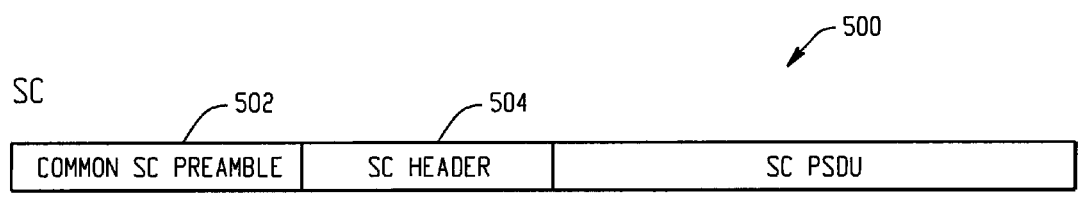
FIGS. 27A and 27B depict a single carrier modulated packet that includes a single carrier header, and an OFDM multiple carrier modulated packet that includes an OFDM header containing an OFDM channel estimation sequence.
Figure 27B:
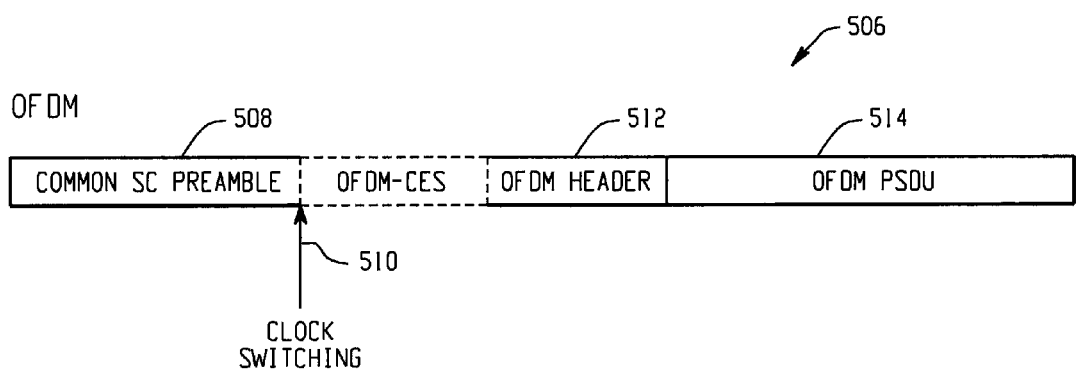

FIGS. 27A and 27B depict a further example. FIG. 27A depicts a single carrier modulated packet 500 that includes a single carrier header. FIG. 27B depicts an OFDM multiple carrier modulated packet 506 that includes an OFDM header that contains an OFDM channel estimation sequence. As shown in FIG. 27A, the single carrier payload packet 500 includes a common single carrier preamble segment 502 and a single carrier header portion 504. In this example, a single carrier payload packet is of a similar form as described above. A variation is shown, however, in the multiple carrier payload packet 506 shown in FIG. 27B. The OFDM multiple carrier modulated packet 506 of FIG. 27B contains a common single carrier preamble portion 508 similar to the one shown in FIG. 27A. However, the OFDM payload packet of FIG. 27B does not include a header portion of the packet in the single carrier portion of the frame. Instead, the clock switching occurs immediately following the single carrier preamble portion 508, as illustrated at 510. An OFDM-CES sub-portion is transmitted followed by an OFDM header portion 512, which is transmitted during the OFDM portion of the OFDM payload packet 506. The OFDM header 512 is then followed by the OFDM payload portion.

Figure 28:
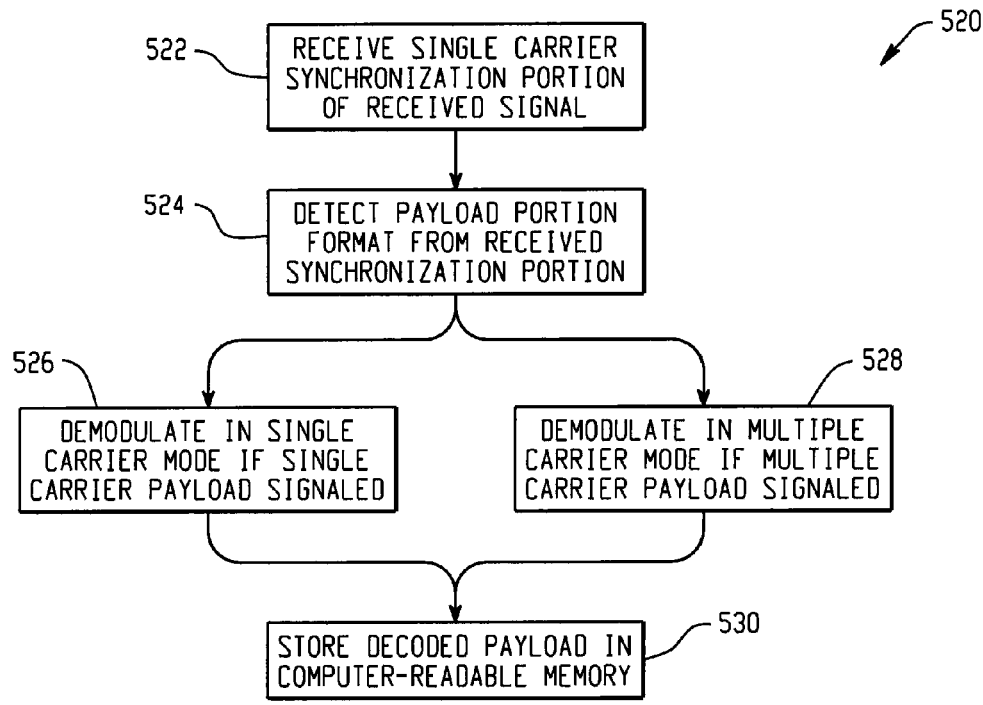
FIG. 28 is a flow diagram for decoding a single carrier mode signal or a multiple carrier mode signal based on a received signaling portion of a received signal.

FIG. 28 is a flow diagram for decoding a single carrier mode signal or a multiple carrier mode signal based on a received signaling portion of a received signal. A single carrier signaling portion of the received signal is received as shown at 522. From the received signaling portion, whether the payload portion of the received signal will be a single carrier signal or a multiple carrier signal is detected at 524. If a single carrier payload is signaled by the signaling portion, then the payload portion of the signal is demodulated and decoded in a single carrier mode as shown at 526. In contrast, if a multiple carrier payload is signaled by the received signaling portion, then the payload portion is demodulated and decoded in a multiple carrier mode as shown at 528. At 530, the decoded payload is then stored in a computer readable memory.

Figure 29:
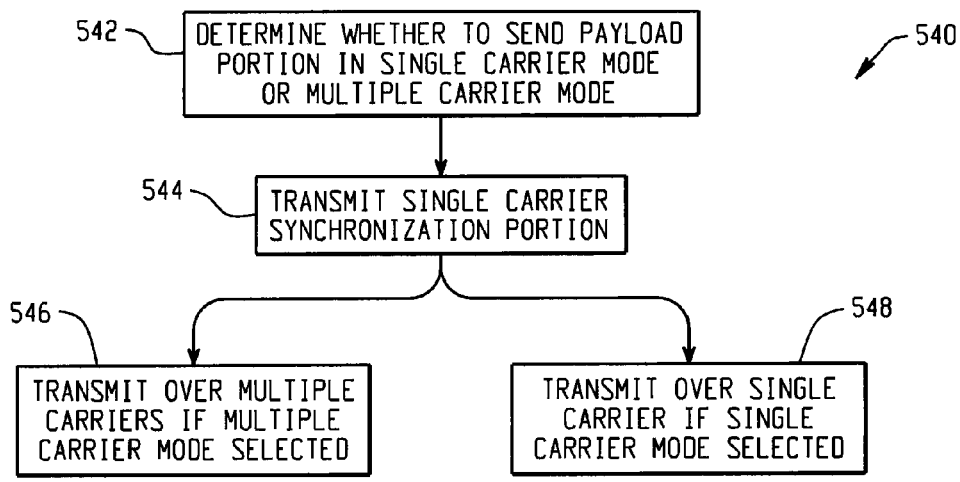
FIG. 29 is a flow diagram for a method for transmitting a single carrier payload or a multiple carrier payload following transmission of a single carrier signaling portion of a signal.

FIG. 29 is a flow diagram for a method for transmitting a single carrier payload or a multiple carrier payload following transmission of a single carrier signaling portion of a signal. At 542, a determination is made whether to send a payload portion of a signal in a single carrier mode or a multiple carrier mode. The transmitter transmits an appropriate single carrier signaling portion of the signal as shown at 544. The signaling portion may identify whether the following payload portion is a single carrier or multiple carrier payload. If the determination is made to send a multiple carrier payload, then the payload is transmitted over multiple carriers as shown at 546. In contrast, if a single carrier payload is to be sent, then the payload is transmitted over a single carrier as illustrated at 548.

Figure 30:
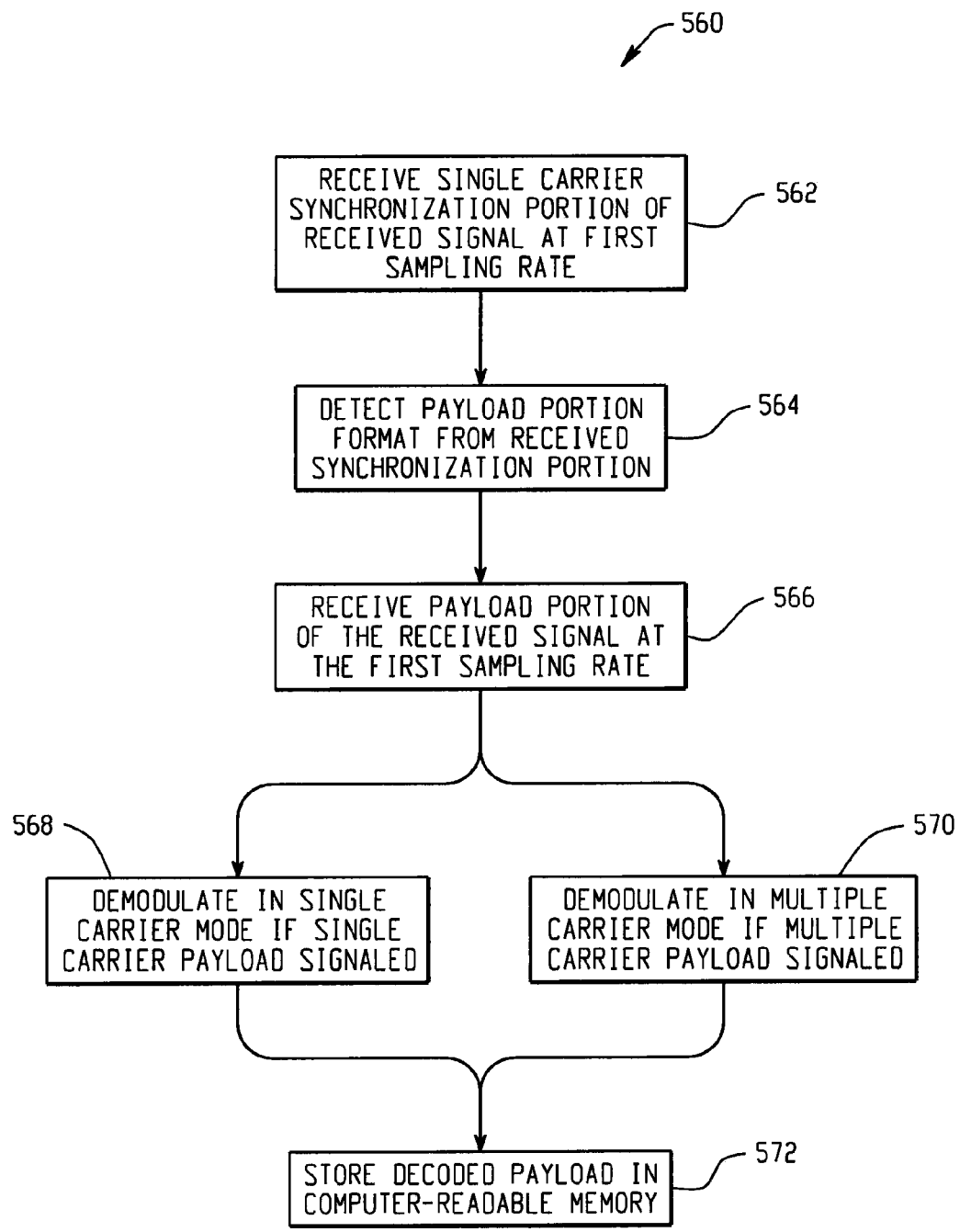
FIG. 30 is a flow diagram for a method for transmitting a single carrier payload or a multiple carrier payload at a common single carrier/multiple carrier sampling rate following transmission of a single carrier signaling portion of a signal.

FIG. 30 is a flow diagram for a method for transmitting a single carrier payload or a multiple carrier payload at a common single carrier/multiple carrier sampling rate following transmission of a single carrier signaling portion of a signal at a first sampling rate. A single carrier signaling portion of the received signal is received at a first rate as shown at 562. From the received signaling portion, whether the payload portion of the received signal will be a single carrier signal or a multiple carrier signal is detected at 564. At 566, a payload portion of the received signal is received at the first sampling rate. If a single carrier payload is signaled by the signaling portion, then the payload portion of the signal is demodulated and decoded in a single carrier mode as shown at 568. In contrast, if a multiple carrier payload is signaled by the received signaling portion, then the payload portion is demodulated and decoded in a multiple carrier mode as shown at 570. At 572, the decoded payload is then stored in a computer readable memory.

Figure 31:
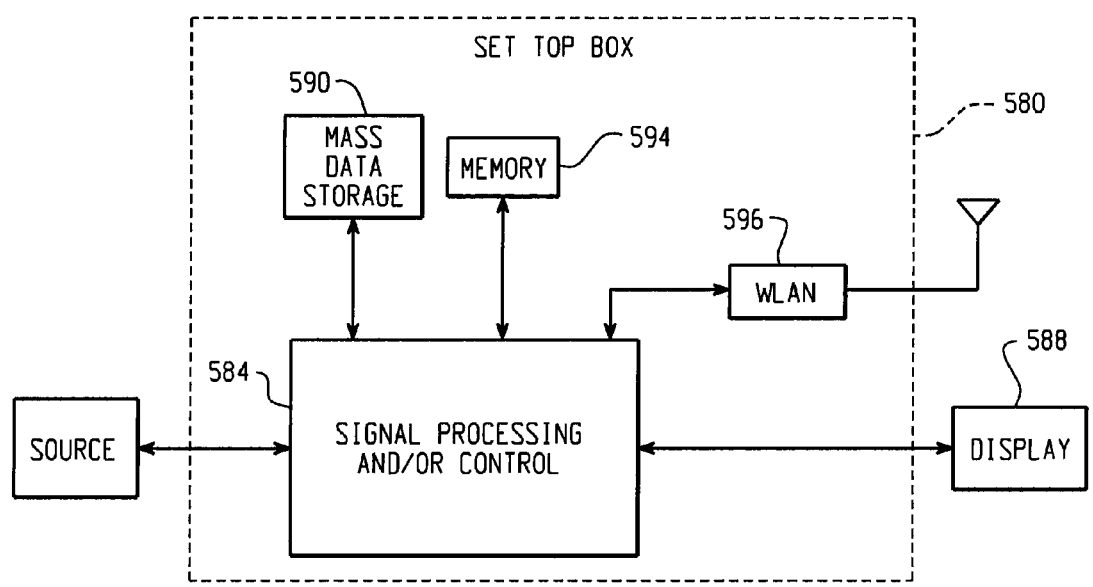
FIG. 31 illustrates an exemplary implementation of the present invention.

The above described concepts may be implemented in a wide variety of applications including those examples described herein below. Referring to FIG. 31, the present invention may be embodied in a device 580. The device can be a device that receives wireless signals—e.g., a storage device, a computer system, a smart phone, a set top box, a cellular phone, a personal digital assistant (PDA), a vehicle, and so on. The present invention may implemented within signal processing and/or control circuits, which are generally identified in FIG. 31 at 584, a WLAN interface and/or mass data storage of the device 580. In one implementation, the device 580 receives signals from a source and outputs signals suitable for a display 588 such as a television and/or monitor and/or other video and/or audio output devices. Signal processing and/or control circuits 584 and/or other circuits (not shown) of the device 580 may process data, perform coding and/or encryption, perform calculations, format data and/or perform any other function as required by a particular application.

The device 580 may communicate with mass data storage 590 that stores data in a nonvolatile manner. Mass data storage 590 may comprise optical and/or magnetic storage devices for example hard disk drives HDD and/or DVDs. The device 580 may be connected to memory 594 such as RAM, ROM, low latency nonvolatile memory such as flash memory and/or other suitable electronic data storage. The device 580 also may support connections with a WLAN via a WLAN network interface 596.

This written description uses examples to disclose the invention, including the best mode, and also to enable a person skilled in the art to make and use the invention. It should be noted that the systems and methods described herein may be equally applicable to other frequency modulation encoding schemes. The patentable scope of the invention may include other examples that occur to those skilled in the art.

It is claimed:

1. A receiver comprising:
an antenna configured to receive a data packet that includes (i) a signaling portion that is single carrier modulated and (ii) a payload portion that is multiple carrier modulated;
a single carrier demodulator configured to demodulate the signaling portion using a single carrier scheme; and
a multiple carrier demodulator configured to demodulate the payload portion using a multiple carrier scheme;
wherein the single carrier demodulation scheme and the multiple carrier demodulation scheme are configured to use the same sampling rate.

2. The receiver of claim 1, wherein the receiver is configured to align sampling times between the single carrier scheme and the multiple carrier scheme.

3. The receiver of claim 1, wherein the single carrier demodulator is configured to demodulate a single carrier modulated channel estimation sequence (CES) of the packet using the single carrier scheme to yield a first demodulated CES, and wherein the multiple carrier demodulator is configured to demodulate a multiple carrier modulated CES of the packet using the multiple carrier scheme to yield a second demodulated CES.

4. The receiver of claim 3, further comprising a processor configured to:
calculate, based on the first demodulated CES, a first channel estimate that is applicable to all portions of the packet; and
calculate, based on the second demodulated CES, a second channel estimate that is applicable to only the payload portion.

5. The receiver of claim 4, wherein the processor is configured to generate, from the first channel estimate and the second channel estimate, a final channel estimate to be used in processing the payload portion.

6. The receiver of claim 1, wherein the multiple carrier scheme is based on orthogonal frequency-division multiplexing (OFDM).

7. A processor-implemented method comprising:
receiving a data packet that includes (i) a signaling portion that is single carrier modulated and (ii) a payload portion that is multiple carrier modulated;
demodulating the signaling portion using a single carrier scheme; and
demodulating the payload portion using a multiple carrier scheme;
wherein the single carrier demodulation scheme and the multiple carrier demodulation scheme use the same sampling rate.

8. The method of claim 7, further comprising:
aligning sampling times between the single carrier scheme and the multiple carrier scheme.

9. The method of claim 7, further comprising:
demodulating a single carrier modulated channel estimation sequence (CES) of the packet using the single carrier scheme to yield a first demodulated CES; and
demodulating a multiple carrier modulated CES of the packet using the multiple carrier scheme to yield a second demodulated CES.

10. The method of claim 9, further comprising:
calculating, based on the first demodulated CES, a first channel estimate that is applicable to all portions of the packet; and calculating, based on the second demodulated CES, a second channel estimate that is applicable to only the payload portion.

11. The method of claim 10, further comprising:
generating, from the first channel estimate and the second channel estimate, a final channel estimate to be used in processing the payload portion.

12. The method of claim 7, wherein the multiple carrier scheme is based on orthogonal frequency-division multiplexing (OFDM).

* * * * *